United States Patent
Takano et al.

[11] Patent Number: 5,148,685
[45] Date of Patent: Sep. 22, 1992

[54] CONTROL SYSTEM FOR VARIABLE-CAPACITY COMPRESSOR IN AIR CONDITIONER

[75] Inventors: Akihiko Takano; Yoshihiko Sakurai; Katsumi Iida, all of Saitama, Japan

[73] Assignee: Zexel Corporation, Tokyo, Japan

[21] Appl. No.: 708,707

[22] Filed: May 31, 1991

[30] Foreign Application Priority Data
Jun. 4, 1990 [JP] Japan .................. 2-144296

[51] Int. Cl.⁵ .............................. G05B 13/02
[52] U.S. Cl. ............................ 62/229; 236/78 D; 318/603; 364/161
[58] Field of Search ............ 236/78 D; 62/229; 318/603; 364/161

[56] References Cited
U.S. PATENT DOCUMENTS 3,938,017  2/1976  Hayes ................. 236/78 D
4,236,202  11/1980  Giles et al. ........... 364/161 X
4,918,932  4/1990  Gustafson et al. ...... 62/229 X Primary Examiner—William E. Wayner

[57] ABSTRACT

In an air conditioner including a variable-capacity compressor, a control system performs a PI calculation based on a temperature deviation between the actual temperature of the air downstream of an evaporator and its target temperature, thereby determining a control amount for controlling the capacity of the compressor. It is judged whether or not the sum of a proportional control component and an integral control component exceeds a limit value of the control amount corresponding to the maximum capacity of the compressor. If this judgment is in the affirmative, an ordinary integral calculation is stopped, and the integral control component is determined by subtracting the proportional control component from this limit value.

4 Claims, 6 Drawing Sheets

CONTROL SYSTEM FOR VARIABLE-CAPACITY COMPRESSOR IN AIR CONDITIONER

BACKGROUND OF THE INVENTION

This invention relates to a system for controlling a variable-capacity compressor in an air conditioner by a so-call PI control.

In a conventional vehicle air conditioner provided with a variable-capacity compressor, the capacity or volume of the compressor is controlled by a computer in order that the actual temperature of the air at a downstream side of an evaporator can be brought close to a target temperature. More specifically, the capacity of the compressor is controlled by a solenoid valve incorporated in the compressor. The microcomputer effects a PI (proportional-plus-integral) control of electric current, supplied to the solenoid valve, in accordance with a deviation between the actual temperature and the target temperature, thereby controlling the capacity of the compressor.

In the above PI control, the integral control component contributes to the stability of the control, and the proportional control component contributes to a rapid responsibility. Therefore, by determining the above supply current in accordance with the sum of the two components, a good control of the compressor can be achieved. However, under a special condition in which the operation continues with the deviation between the actual temperature and the target temperature remaining unovercome for a long time, the integral control component causes adverse effects.

For example, if the air conditioner is operated in a hot day, in accordance with the large temperature deviation, the proportional control component is so determined as to increase the capacity of the compressor, and also the integral control component is gradually increased in such a direction as to increase the capacity of the compressor. Incidentally, the capacity of the compressor is limited by its mechanism or for other reasons. Even if the compressor is operated in its maximum capacity condition to bring the cooling ability of the air conditioner to its maximum level, it takes long time for the actual temperature to reach the target temperature. Therefore, when the actual temperature reaches the target temperature, the proportional control component becomes zero, but the integral control component tending to increase the capacity still remains as a large value. Therefore, the supply current has such a value that the capacity of the compressor much exceeds a level required to maintain the actual temperature at the target temperature. As a result, the actual temperature drops from the target temperature. In the process of dropping of the actual temperature from the target temperature, the proportional control component has such a value as to decrease the capacity; however, when the temperature deviation is small, the proportional control component is also small, and therefore can not cancel the integral control component. As a result, an excessive cooling is caused. And besides, it takes long time for the control to become stable after the excessive cooling.

Also, there is the following occasion. Namely, the actual temperature is higher than the target temperature, and the temperature deviation is not sufficiently reduced for a long time even when the capacity of the compressor is increased to the maximum level. In this condition, when the target temperature is changed to become higher than the actual temperature, the proportional control component is changed to the value tending to decrease the capacity of the compressor whereas the integral control component has already had the value much exceeding the value tending to increase the capacity of the compressor to the maximum level. As a result, the supply current, determined by the sum of the proportional control component and the integral control component, is maintained at the value tending to increase the capacity of the compressor to the maximum level, and is not soon changed in the direction to decrease the capacity of the compressor. As a result, the response is greatly delayed.

Japanese Laid-Open (Kokai) Patent Application No. 184517/88 discloses a control system in which the capacity of a compressor is subjected to a PID control. In this control system, when a vehicle is accelerated and also when a clutch for transmitting the rotation of an engine to the compressor is disengaged, the capacity of the compressor is decreased to the minimum level, and an integral control component is reset to a predetermined value (for example, zero). However, this prior art publication does not describe means for comparing the sum of the proportional control component and the integral control component with the limit value of the control amount corresponding to the maximum capacity and the minimum capacity of the compressor, and means for stopping the integral calculation when the above sum exceeds the limit value of the control amount and for determining the integral control component by subtracting the proportional control component from the limit value of the control amount.

SUMMARY OF THE INVENTION

It is an object of this invention to provide a control system which can satisfactorily effect a PI control of the capacity of a compressor of an air conditioner even when a deviation between the actual temperature of the air downstream of an evaporator and its target temperature is not eliminated for a long time.

According to the present invention, there is provided a system for controlling a variable-capacity compressor in an air conditioner including an evaporator, the compressor compressing a cooling medium discharged from the evaporator, the system comprising:

(a) capacity control means for controlling the capacity of the compressor;

(b) detection means for detecting the actual temperature of the air downstream of the evaporator;

(c) target temperature setting means for setting a target temperature of the air downstream of the evaporator;

(d) temperature deviation calculation means for calculating a temperature deviation between the actual temperature and the target temperature;

(e) proportional calculation means for calculating a proportional control component in accordance with the temperature deviation;

(f) integral calculation means for calculating an integral control component in accordance with the temperature deviation;

(g) control amount calculation means for calculating, in accordance with the sum of the proportional control component and the integral control component, the amount of control to be applied to the capacity control means;

(h) judgment means for judging whether or not the sum of the proportional control component and the integral control component exceeds a limit value of the control amount corresponding to the maximum capacity of the compressor; and (i) integral correction means for subtracting the proportional control component from the limit value of the control amount so as to determine the integral control component when the judgment means judges that the sum exceeds the limit value.

DESCRIPTION OF THE PREFERRED EMBODIMENT OF THE INVENTION

One preferred embodiment of the invention will now be described with reference to the drawings.

Figure 1:
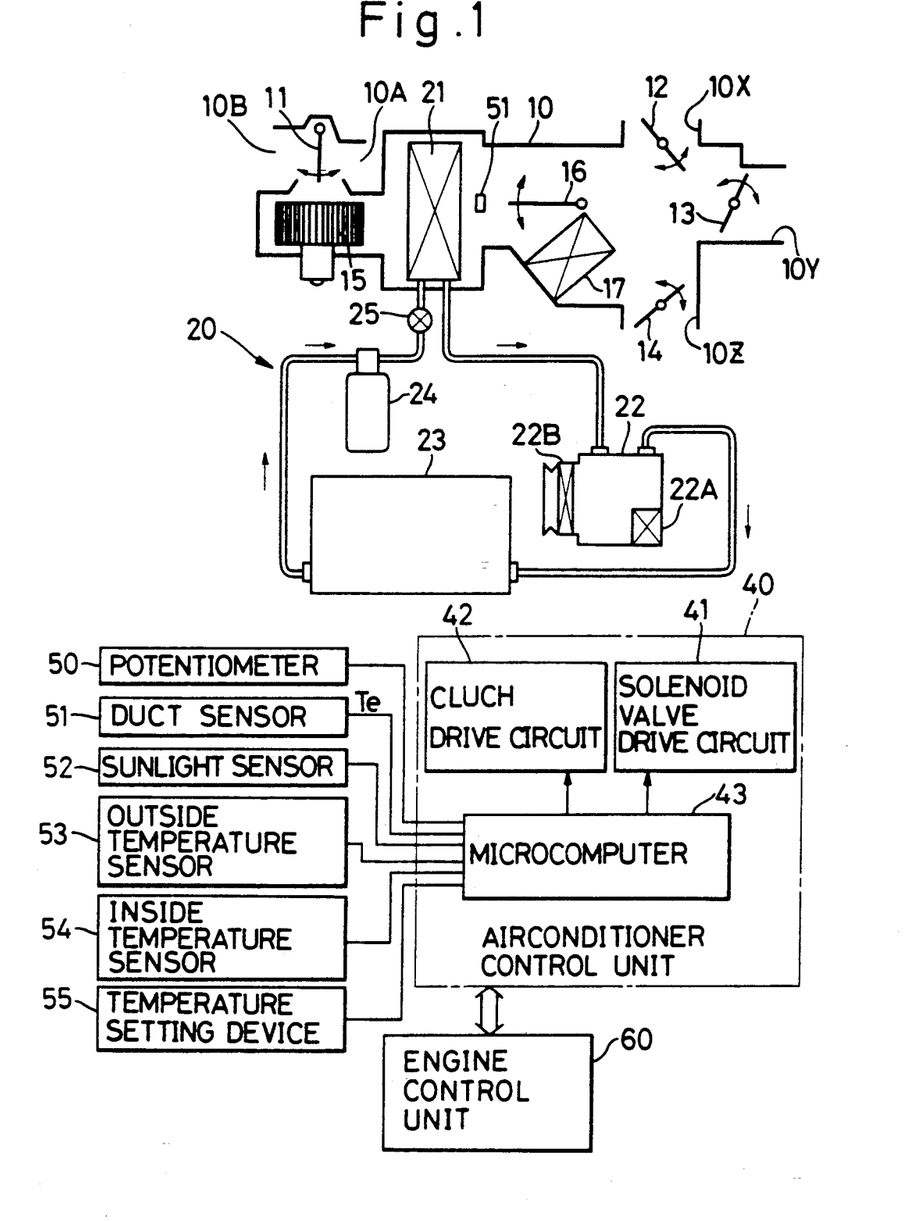
FIG. 1 is a view showing a general construction of an air conditioner for a vehicle, and also showing a control system for controlling a variable-capacity compressor of the air conditioner in terms of a circuit block diagram.

FIG. 1 schematically shows the general construction of an air conditioner for an automobile (vehicle). This air conditioner is provided with a duct 10. An upstream end portion of the duct 10 has an inside air inlet 10A for introducing the air inside the automobile, and an outside air inlet 10B for introducing the air outside the automobile. An intake door 11 is mounted on the upstream end portion of the duct 10. The intake door 11 is angularly moved in a controlled manner so as to select one of the inside air introduction and the outside air introduction or to adjust the mixture ratio of the inside air to the outside air.

The downstream end portion of the duct 10 is branched or divided into three sections, that is, an air blowout port 10X for blowing out the air toward a front glass (windshield) of the automobile, an air blowout port 10Y for blowing out the air toward the face of a passenger, and an air blowout port 10Z for blowing out the air toward the feet of the passenger. Mode doors 12, 13 and 14 are provided in the blowout ports 10X, 10Y and 10Z, respectively. The mode doors 12, 13 and 14 are suitably opened and closed so as to select one or more of the blowout ports 10X, 10Y and 10Z.

An air blower or fan 15, an evaporator 21, an air mix door 16 and a heater 17 are arranged in the duct 10 in this order in the downstream direction. The evaporator 21 is a constituent part of a cooling system 20 (later described). The evaporator 21 serves as a heat exchanger for cooling the air flowing through the duct 10. The heater 17 serves as a heat exchanger for heating the air, flowing through the duct 10, by the use of a cooling water of the engine.

In accordance with the degree of opening of the air mix door 16, the air mix door 16 adjusts the ratio of the air flowing through the heater 17 to the air not flowing through the heater 17. The air flowing through the heater 17 and the air not flowing through the heater 17 are mixed together at the downstream side of the heater 17, so that the temperature of the air is adjusted. Then, the air is blown out from a selected one of the blowout ports 10X, 10Y and 10Z into the interior of the automobile.

The intake door 11, the mode doors 12 to 14 and the air mix door 16 are opened and closed by associated actuators, respectively.

The above cooling system 20 is designed to circulate a cooling medium, and comprises the evaporator 21, a compressor 22, a condenser 23, a receiver tank 24 and an expansion valve 25 which are arranged in this order in the direction of flow of the cooling medium. The cooling medium discharged from the expansion valve 25 is supplied to the evaporator 21.

The compressor 22 is in the form of a conventional swashtype variable-capacity compressor. Briefly stated, the compressor 22 includes a solenoid valve 22A serving as a capacity adjustment means. The solenoid valve 22A controls the pressure in the internal space (crank chamber) of a valve housing. In accordance with the pressure within this crank chamber, the angle of inclination of the swash plate (which is received in the crank chamber) relative to the axis of the valve housing is determined, and the capacity of the compressor 22 is determined in accordance with this angle of inclination of the swash plate. The compressor 22 of this type is disclosed, for example, in Japanese Laid-Open Patent Application Nos. 96407/77 and 9682/88.

In this embodiment, when electric current supplied to the solenoid valve 22A is increased, the capacity of the compressor 22 is decreased to decrease the cooling ability of the evaporator 21. In contrast, when this supply current to the solenoid valve 22A is decreased, the capacity of the compressor 22 is increased to increase the cooling ability of the evaporator 21. When the supply current is 0(A), the capacity is the maximum, and when the supply current is 0.65 A, the capacity is the minimum. This supply current serves as the control amount for controlling the capacity of the compressor 22.

The variable-capacity compressor 22 includes an electromagnetic clutch 22B which selectively transmits the torque from the engine (not shown) to the compressor 22.

A control system for controlling the air conditioner includes a control unit 40. The control unit 40 comprises drive circuits (not shown) for driving the actuators of the doors 11 to 14 and 16 and the air blower 15, respectively, a drive circuit 41 for driving the solenoid valve 22A, a drive circuit 42 for driving the electromagnetic clutch 22B, and a microcomputer 43 for supplying control signals to these drive circuits, respectively.

The control system further comprises a potentiometer 50 for detecting the angle of the air mix door 16, a duct sensor 51 for detecting the actual temperature Te of the air downstream of the evaporator 21, a sunlight sensor 52 for detecting the amount of the sunlight entering the passenger room of the automobile, an outside (ambient) temperature sensor 53 for detecting the temperature outside the passenger room, an inside temperature sensor 54 for detecting the temperature in the passenger room, and a temperature setting device 55 for setting the temperature in the passenger room. Analog data from the potentiometer 50, the sensors 51 to 54 and the temperature setting device 55 are fed via a multiplexer (not shown) to an analog-to-digital converter (not shown) where these analog data are converted into digital data which are inputted into the microcomputer 43.

The control unit 40 for the air conditioner is connected to an engine control unit 60 so that they can receive and send the signals therebetween. For example, a signal representative of the amount of pressing-down of an accelerator is fed from the engine control unit 60 to the control unit 40, and in accordance with the increase of this pressing-down amount, the microcomputer 43 can judge that the vehicle is in an accelerating condition. The control unit 40 feeds, for example, OFF instruction information of the electromagnetic clutch 22B to the engine control unit 60.

Figure 3:
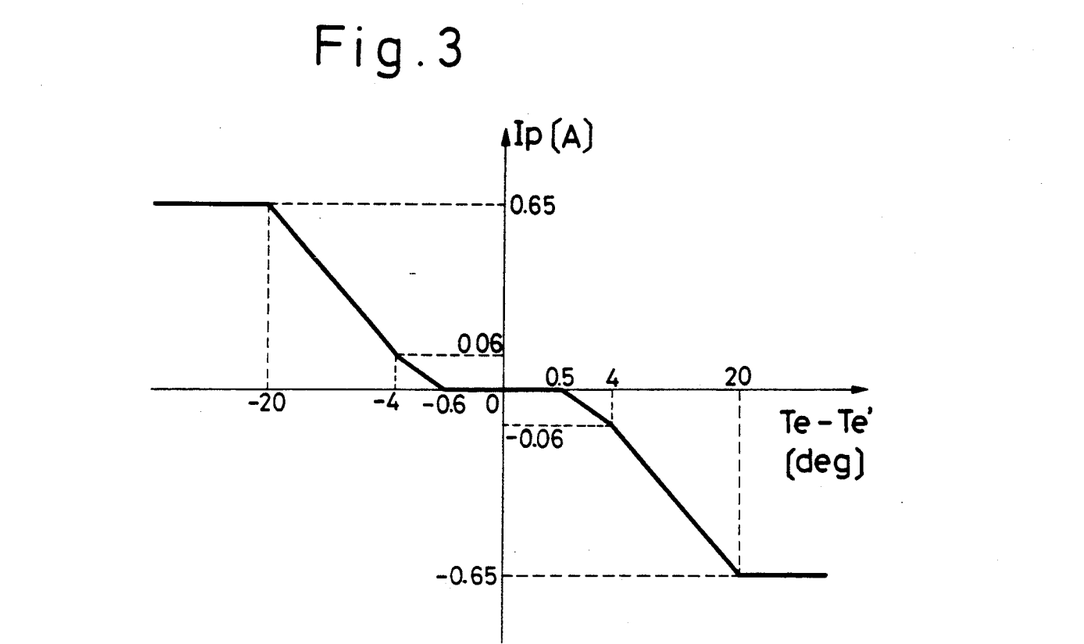
FIG. 3 is a graph showing the relation between a proportional control component Ip and a temperature deviation.

Next, the control of the capacity of the compressor 22 (that is, the control of the supply current Is to the solenoid valve 22A) executed by the microcomputer 43 of the control unit 40 will now be described briefly. Basically, the supply current Is is subjected to a PI control at a predetermined cycle $\Delta t$ (here, 0.5 sec.). More specifically, the supply current Is is expressed by the following formula:

$$Is = Ip + Ii(t) \quad (1)$$

where Ip represents a proportional control component which is determined in accordance with a deviation (Te−Te') between the actual temperature Te (which is detected by the duct sensor 51) of the air downstream of the evaporator 22 and its target temperature Te', based on a map (FIG. 3) stored in a memory. The target temperature Te' is determined by another routine in accordance with the signals from the potentiometer 50, the sensors 52, 53 and 54 and the temperature setting device 55.

Figure 4:
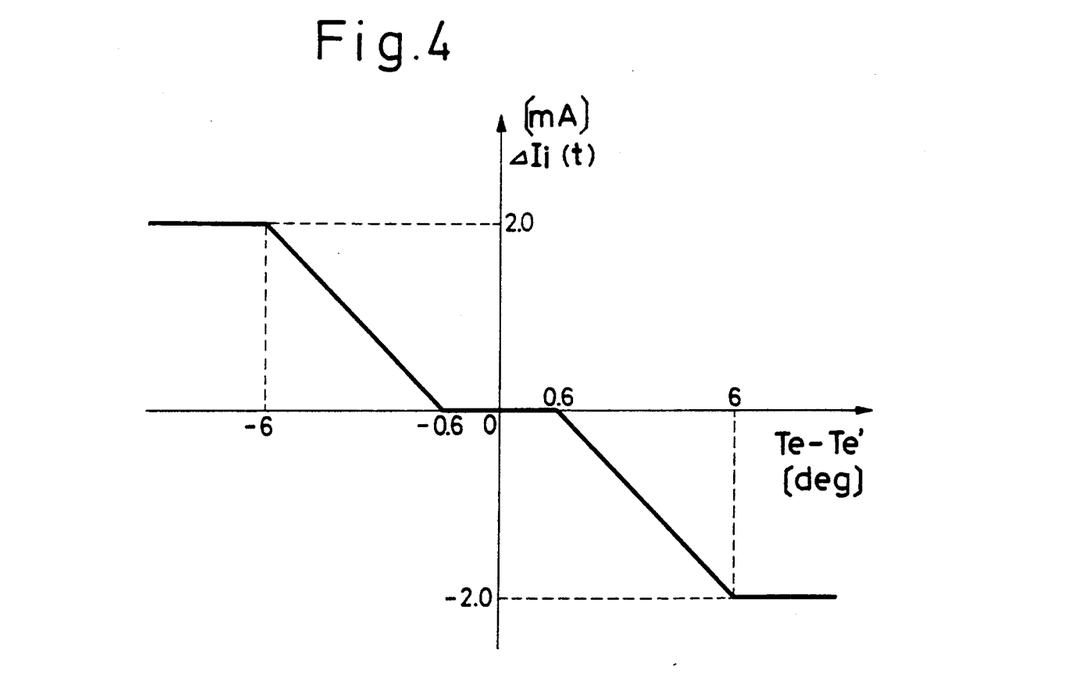
FIG. 4 is a graph showing the relation between an addition component ΔIi(t) for the integration and the temperature deviation.

Ii(t) in the above formula (1) represents a integral control component which is obtained from the following formula (2):

$$Ii(t) = Ii(t - \Delta t) + \Delta Ii(t) \quad (2)$$

where t represents the current time, and (t−Δt) represents the time one cycle Δt before the current time. Ii(t) represents the integral control component calculated at the current cycle, and Ii(t−Δt) represents the integral control component calculated at the preceding cycle. ΔIi(t) represents an addition component in the integral calculation which is determined in accordance with the above temperature deviation (Te−Te'), based on a map (FIG. 4) stored in a memory.

In the above control, the supply current Is to the solenoid valve 22A is basically limited to the following range:

$$0(A) \leq Is \leq 0.65(A) \quad$$

As described above, when the supply current Is has the lower limit value of 0(A), the capacity of the compressor 22 is the maximum, so that the cooling ability of the evaporator 21 is the maximum. In contrast, when the supply current Is has the upper limit value of 0.65A, the capacity of the compressor 22 is the minimum, so that the cooling ability of the evaporator 21 is the minimum.

Figure 2:
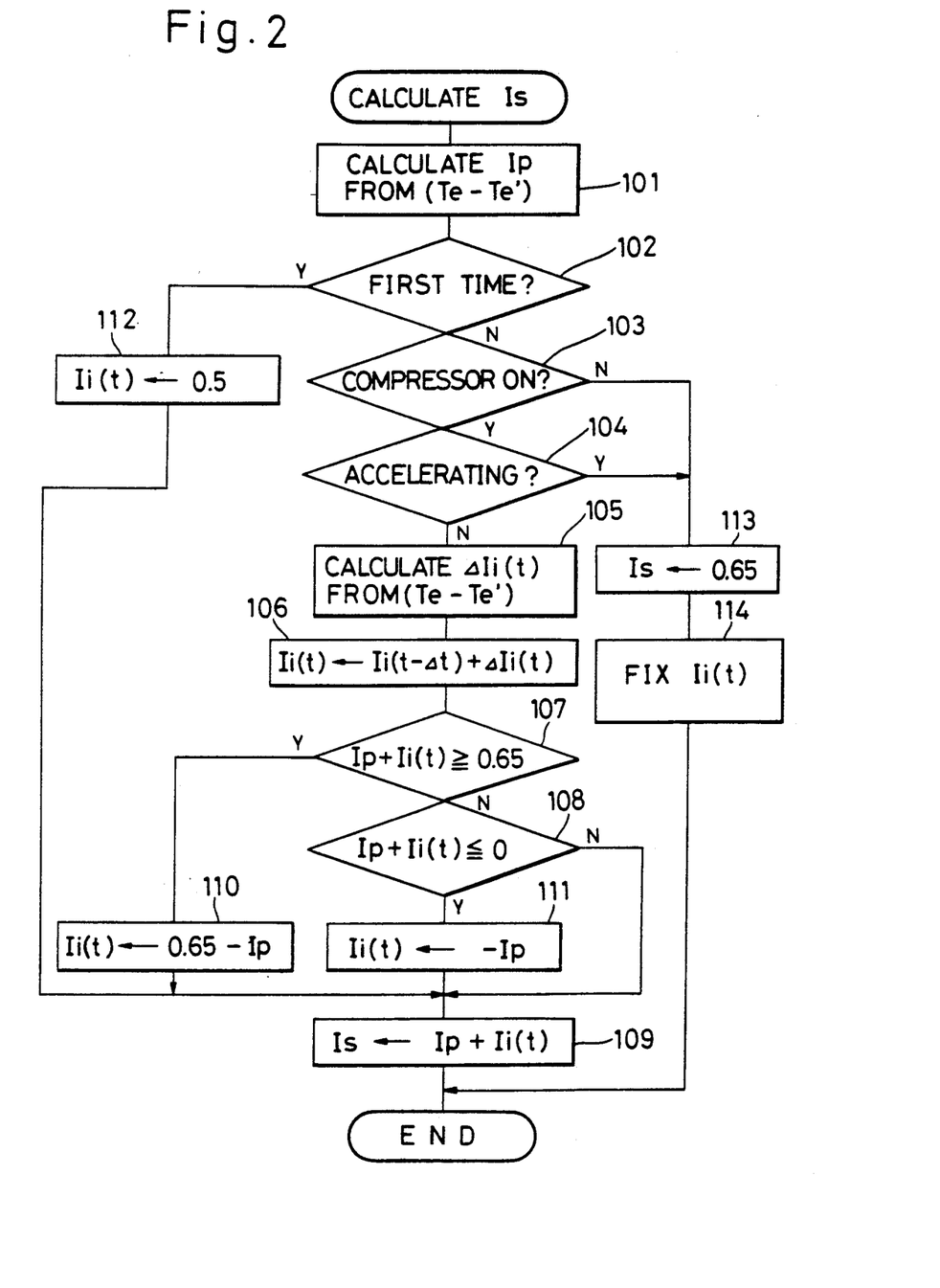
FIG. 2 is a flow chart of a routine for calculating electric current supplied to a solenoid valve of the compressor, this routine being executed by a microcomputer of the control system of FIG. 1.

A routine for the control of the supply current Is, which is executed by the microcomputer 43, will now be described in detail with reference to a flow chart of FIG. 2. In the first Step 101, the proportional control component Ip is calculated. Namely, the proportional control component Ip is found from the map of FIG. 3, using the temperature deviation (Te−Te') as an address.

Next, in Step 102, it is judged whether or not the air conditioner begins its operation, that is, whether or not this is the first routine after the control unit 40 is powered on. If the judgment in Step 102 is "NO", it is judged in Step 103 whether or not the compressor 22 is actually being operated, that is, whether or not the electromagnetic clutch 22B is in the ON state. If the judgment in Step 103 is "YES", the program proceeds to Step 104 where it is judged whether or not the vehicle is in an accelerating condition. If the judgment in Step 104 is "NO" (that is, it is judged that the vehicle is not in the accelerating condition), the addition component ΔIi(t) for the integration is calculated (Step 105). Namely, based on a map of FIG. 4, the addition component ΔIi(t) is found, using the temperature deviation (Te−Te') as an address. Then, the integral control component Ii(t) at this cycle is found by adding the above addition component ΔIi(t) to the integral control component Ii(t−Δt) of the preceding cycle (Step 106).

Then, it is judged whether or not the sum of the proportional control component Ip, calculated in the above Step 101, and the integral control component Ii(t) calculated in the above Step 106 is equal to or more than the upper limit value of 0.65 (Step 107). If the judgment in Step 107 is "NO", it is judged whether or not the above sum Ip+Ii(t) is equal to or less than the lower limit value of 0 (Step 108). If the judgment in Step 108 is "NO", the sum Ip+Ii(t) is again calculated to determine the supply current Is (Step 109). The proportional control component Ip used here is the one calculated in Step 101, and the integral control component Ii(t) used here is the one calculated in Step 106. In a normal operating condition, the above steps 101 to 109 are repeated, thereby effecting the ordinary PI control.

If the judgment in the above Step 107 is "YES" (that is, it is judged that the sum Ip+Ii(t) is equal to or more than 0.65), the integral control component Ii(t) is found by the following formula (Step 110):

$$Ii(t) = 0.65 - Ip$$

Therefore, the sum Ip+Ii(t) (that is, the supply current Is) calculated in the subsequent Step 109 is the upper limit value of 0.65.

If the judgment in the above Step 108 is "YES" (that is, it is judged that the sum Ip+Ii(t) is equal to or less than the lower limit value of 0), the integral control component Ii(t) is found by the following formula (Step 111):

$$Ii(t) = -Ip$$

Therefore, the sum Ip+Ii(t) (that is, the supply current Is) calculated in the subsequent Step 109 is the lower limit value of 0.

If it is judged in the above Step 102 that this routine is the first one after the power-on, Ii(t) is set to 0.5(A) (Step 112), and then the program skips Steps 103 to 108 and proceeds to Step 109.

If it is judged in the above Step 103 that the compressor 22 is not being operated, or if it is judged in the above Step 104 that the vehicle is in the accelerating condition, the program proceeds to Step 113 in which the supply current Is is fixed to the upper limit value of 0.65(A). Namely, the capacity of the compressor 22 is controlled to the minimum level. Then, the program proceeds to Step 114 in which Ii(t) is fixed to the precedingly-calculated value, thus finishing this routine.

Next, the operation of the control system will be described more specifically with reference to FIGS. 5 to 9. In these Figures, for better understanding of the present invention, the proportional control component Ip, the integral control component Ii(t) and the supply current Is are depicted ideally.

Figure 5:
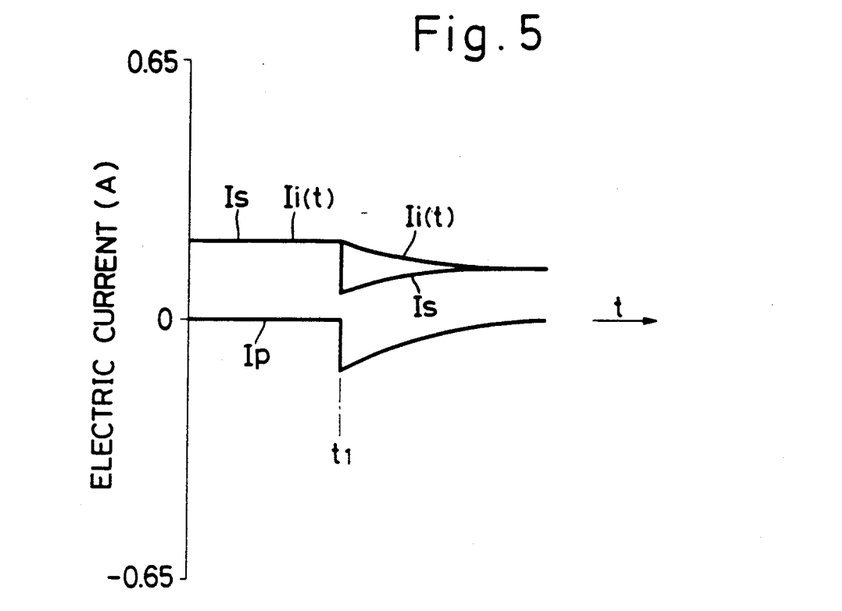
FIGS. 5 to 9 are graphs showing the supply current, the proportional control component and the integral control component on difference conditions.
Figure 6:
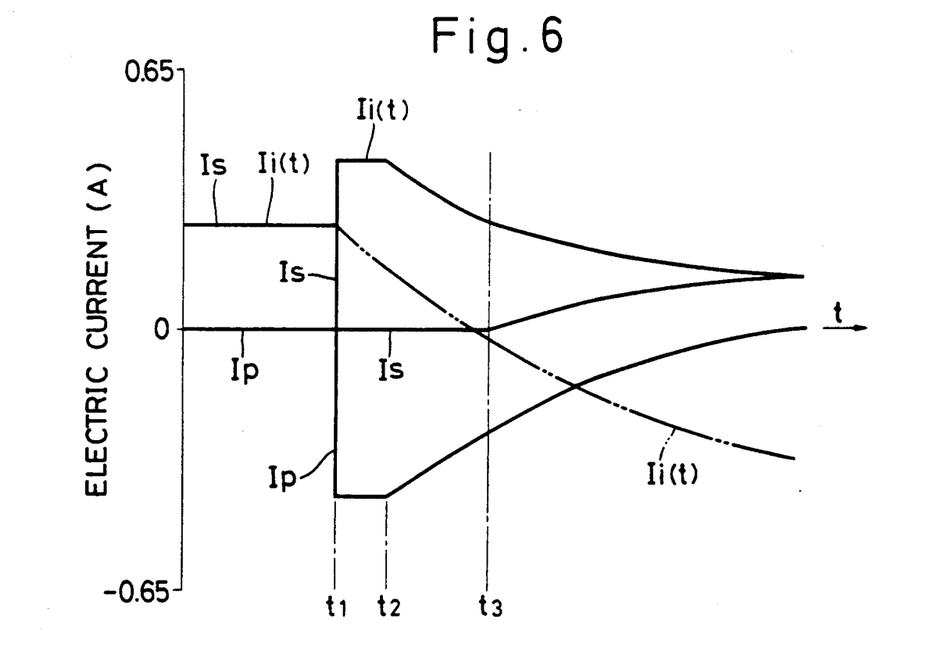

Reference is first made to the case where the target temperature is changed to be lowered at time t1 in the stable condition of the control in which the proportional control component Ip is substantially zero, and the supply current Is is substantially equal to the integral control component Ii(t), as shown in FIGS. 5 and 6. The temperature deviation (Te−Te′) abruptly increases in the positive (plus) direction at time t1. Therefore, the proportional control component Ip, calculated in Step 101 of the routine immediately after time t1, is abruptly changed into a minus (negative) value. The integral control component Ii(t), calculated in Step 106 of the routine, is decreased only slightly since the value of ΔIi(t) is small.

In Step 108 of the routine immediately after time t1, if it is judged that the sum Ip+Ii(t) is not zero but is a positive value, the ordinary integral calculation is carried out, and the integral control component Ii(t) is gradually decreased in accordance with the positive temperature deviation (Te−Te′) regardless of the proportional control component Ip, as shown in FIG. 5. Therefore, the supply current Is abruptly decreases at time t1 in accordance with the change of the proportional control component Ip, and thereafter is increasing. Then, when the temperature deviation (Te−Te′) becomes zero, the proportional control component Ip becomes zero, and the integral control component Ii(t) and the supply current Is are brought generally into the optimum level.

In Step 108 of the routine immediately after time t1, if it is judged that the sum Ip+Ii(t) is equal to or less than zero, the integral control component Ii is decided to be −Ip in Step 111. Namely, as shown in FIG. 6, the integral control component Ii(t) abruptly increases to a positive value whose absolute value is equal to that of the proportional control component Ip, and the supply current Is abruptly decreases to the lower limit value of 0(A). As a result, the compressor 22 operates at its maximum capacity. When the temperature deviation (Te−Te′) is not changed, the proportional control component Ip, calculated in Step 106 of the next routine, is not changed, and the integral control component Ii(t) calculated in Step 106, is decreased slightly from −Ip. Therefore, since the judgment in Step 108 is "YES", Step 111 is again executed, so that the integral control component Ii(t) is decided to be −Ip. Therefore, if the condition in which the temperature deviation (Te−Te′) is not changed continues, the ordinary integral calculation is not carried out, and the integral control component Ii(t) is not changed, and the supply current Is is maintained at the lower limit value of 0(A).

When the temperature deviation (Te−Te′) becomes smaller, so that the proportional control component Ip begins to increases (as indicated at time t2 in FIG. 6), the integral control component Ii(t) begins to decrease. When the decrease of the temperature deviation is so small that the amount of change of the proportional control component Ip per cycle Δt (0.5 second) of the above control is smaller than the addition component ΔIi(t) for the integration, the judgment in the affirmative ("YES") is repeated in Step 108, and therefore the ordinary integral calculation is not carried out, and as shown in FIG. 6, the integral control component Ii(t) is decreasing with its absolute value kept equal to that of the proportional control component Ip. As a result, the supply current Is is maintained at the lower limit value of 0(A), and the compressor 22 continues to operate at its maximum capacity.

When the decrease of the temperature deviation becomes so large that the amount of change of the proportional control component Ip per cycle of the above control becomes larger than the addition component ΔIi(t) for the integration (as indicated at time t3 in FIG. 6), the judgment in the negative ("NO") is made in Step 108, and the ordinary integral calculation is carried out. Namely, the integral control component Ii(t) is gradually decreasing in accordance with the positive temperature deviation (Te−Te′) regardless of the proportional control component Ip. Therefore, the supply current Is is gradually increasing from time t3. Then, when the temperature deviation becomes zero, and the integral control component Ii(t) and the supply current Is are brought generally into the optimum level.

If immediately after time t2, the amount of change of the proportional control component Ip per cycle of the above control is larger than the addition component ΔIi(t) for the integration, the ordinary integral calculation is started from time t2, and the integral control component Ii(t) is gradually decreasing in accordance with the positive temperature deviation (Te−Te′) regardless of the proportional control component Ip. Therefore, the supply current Is is gradually increasing from time t2.

As described above, when the compressor 22 is operating at its maximum capacity, the integral calculation is not carried out, and when the compressor 22 is brought out of its maximum capacity operation, the integral calculation is started. And besides, the initial value of the integral control component Ii(t) is equal in absolute value to the proportional control component Ip, and therefore is corresponding to the temperature deviation at this time. As a result, when the temperature deviation becomes zero, the integral control component Ii(t) can be brought to the above optimum level or a level close to it. Therefore, an excessive cooling can be prevented, and the time required for the control to become stable can be shortened.

Even when the temperature deviation is very large, the lower limit value of the proportional control component Ip is −0.65(A) which is equal in absolute value to the upper limit value (0.65(A)) of the supply current, and therefore the integral control component Ii(t) at the time of stopping the integral calculation is limited to the upper limit value 0.65(A) of the supply current. This prevents the integral control component Ii(t) from being set to an excessive value.

For comparison purposes, the integral control component Ii(t) obtained by carrying out the integral calculation in a conventional manner is indicated in a dots-and-dash line in FIG. 6. As is clear from this line, the integration is carried out during the time period between time t1 to time t3, and therefore if this time period is long, the integral control component Ii(t) may be excessively low to have a large negative value. In this case, until the temperature deviation becomes zero and also for a time period thereafter which can not be disregarded, the compressor 22 operates at its maximum capacity. As a result, an excessive cooling occurs, and it takes much time for the control to become stable.

Figure 7:
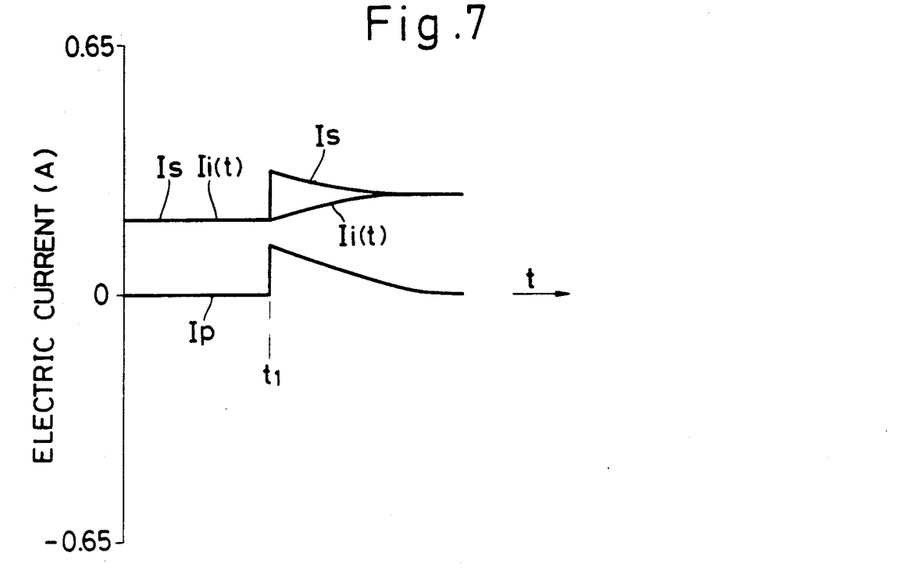
Figure 8:
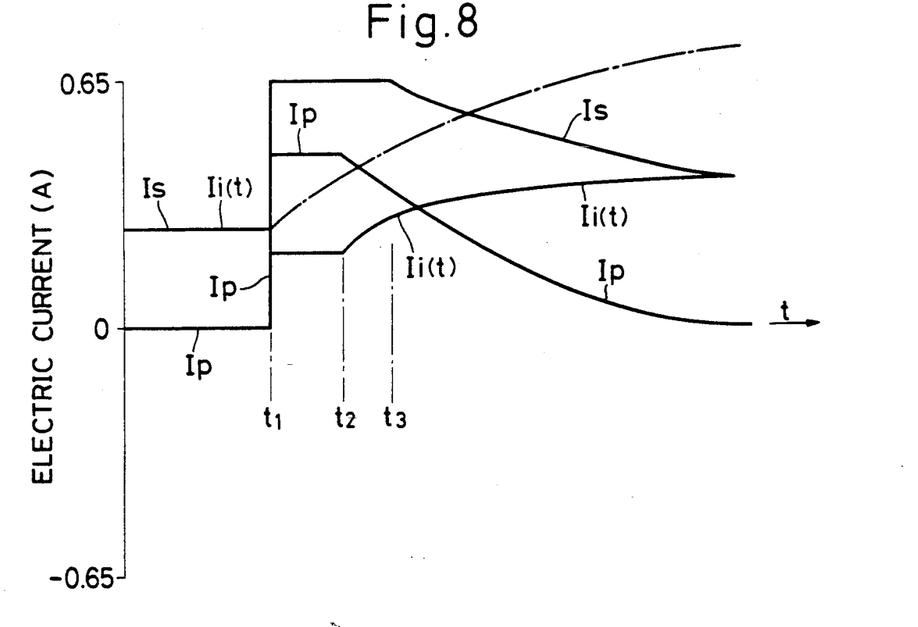

Next, reference is briefly made to the case where the target temperature becomes high at time t1 in contrast with the above case in the stable condition of the control in which the proportional control component Ip is substantially zero, and the supply current Is is substantially equal to the integral control component Ii(t), as shown in FIGS. 7 and 8. In this case, the temperature deviation (Te−Te′) abruptly increases in the negative (minus) direction at time t1, so that the proportional control component Ip is abruptly changed into a positive value.

After time t1, if the sum Ip+Ii(t) is less than 0.65 (A), the ordinary integration is carried out, and the integral control component Ii(t) is gradually increasing in accordance with the above negative temperature deviation (Te−Te′) regardless of the proportional control component Ip, as shown in FIG. 7. The supply current Is abruptly increases at time t1 in accordance with the change of the proportional control component Ip, and is decreasing gently thereafter. Then, when the temperature deviation becomes zero, the proportional control component Ip becomes zero, and the integral control component Ii(t) and the supply current Is are brought generally into a certain optimum level.

If the sum Ip+Ii(t) is equal to or more than 0.65 (A) at time t1, the integral control component Ii(t) has a value of 0.65−Ip, and abruptly increases, as shown in FIG. 8. The supply current Is increases to the upper limit value of 0.65 (A). As a result, thereafter, the compressor 22 operates at its minimum capacity. If the temperature deviation does not become small because of a relatively low outside temperature with the result that the proportional control component Ip is not changed, the integral control component Ii(t) is also not changed. Namely, the microcomputer 43 does not perform the ordinary integral calculation. As a result, the supply current Is is maintained at the upper limit value of 0.65 (A).

At time t2 when the temperature deviation becomes small, so that the proportional control component Ip begins to decrease, the integral control component Ii(t) also begins to increase. When the decrease of the temperature deviation is so small that the amount of change of the proportional control component Ip per cycle of the above control is smaller than the addition component ΔIi(t) for the integration, the integral control component Ii(t) is changed by the same amount as the proportional control component Ip in the direction opposite to the direction of change of the proportional control component Ip, as shown in FIG. 8, and the ordinary integral calculation is not carried out. As a result, the supply current Is is maintained at 0.65 (A), and the compressor 22 continues to operate at its minimum capacity. From time t3 when the amount of change of the proportional control component Ip per cycle of the above control becomes larger than the addition component ΔIi(t) for the integration as a result of a larger decrease of the temperature deviation, the integral control component Ii(t) can be obtained by the ordinary integral calculation, and is gradually increasing regardless of the proportional control component Ip. Then, when the temperature deviation becomes zero, the proportional control component Ip becomes zero, and the integral control component Ii(t) and the supply current Is are brought generally to the optimum level.

If immediately after the above time t2, the amount of change of the proportional control component Ip per cycle of the above control is larger than the addition component ΔIi(t) for the integration, the integral control component Ii(t) can be obtained by the ordinary integral calculation from time t2, and is gradually increasing. Therefore, the supply current Is is gradually decreasing from time t2.

As described above, even when the compressor 22 is operating at its minimum capacity, the integral calculation is not carried out, and when the compressor 22 is brought out of its minimum capacity operation, the integral calculation is carried out. And besides, the initial value of the integral control component Ii(t) is the value obtained by subtracting the proportional control component Ip from the upper limit value 0.65 (A) of the supply current, and is corresponding to the temperature deviation at this time. As a result, when the temperature deviation becomes zero, the integral control component Ii(t) can be brought to the above optimum level or a level close to it. Therefore, the time required for the control to become stable can be shortened.

Even if the temperature deviation is very large, the upper limit value of the proportional control component Ip is 0.65 (A) which is equal to the upper limit value (0.65 (A)) of the supply current. Therefore, the integral control component Ii(t) at the time of stopping the integral calculation is limited to the lower limit value (0(A)) of the control current. Therefore, the integral control component Ii(t) is prevented from being set to an unduly low value.

For comparison purposes, the integral control component Ii(t) obtained by carrying out the integral calculation in a conventional manner is indicated in a dots-and-dash line in FIG. 8. As is clear from this line, the integration is carried out during the time period between time t1 and time t3, and therefore if this time period is long, the integral control component Ii(t) may be excessively higher than the upper limit value of 0.65 (A). Therefore, until the temperature deviation becomes zero and also for a certain time period thereafter, the compressor 22 continues to operate at its minimum capacity, and it takes much time for the control to become stable.

Figure 9:
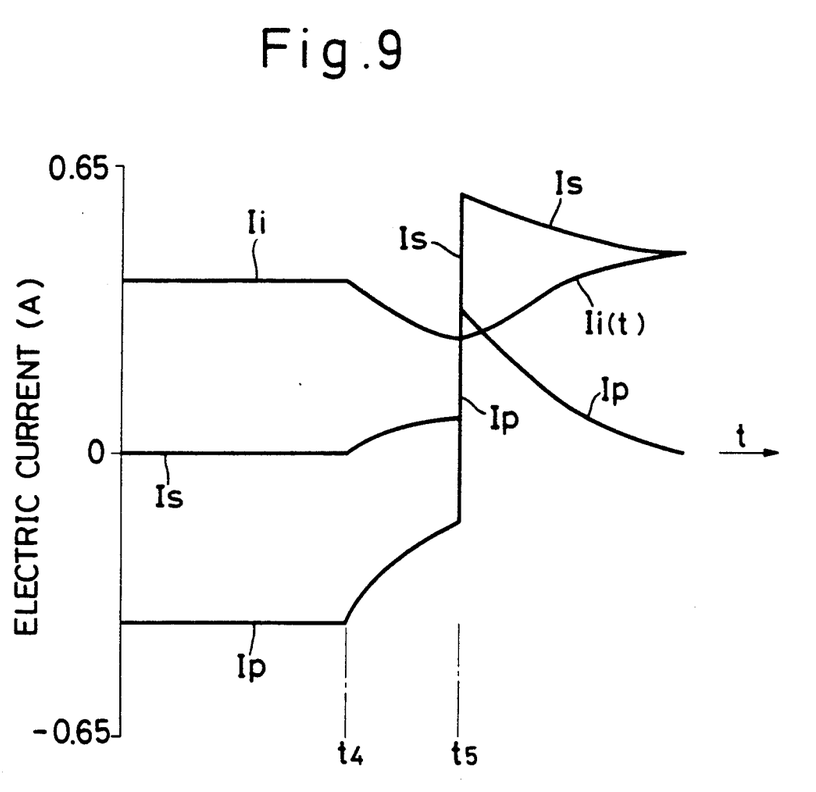

Reference is now made to the case where the air conditioner is operated when the temperature in the passenger room of the vehicle is high. This will be described with reference to FIG. 9. A transient condition immediately after the start of the operation is ignored here. Since the temperature deviation (te−Te′) is very large, the proportional control component Ip has a negative value, and its absolute value is large. The integral control component Ii(t) has a positive value which is equal in absolute value to that of the proportional control component Ip. The supply current Is is 0(A), and the compressor 22 is driven to be operated at its maximum capacity. At time t4, the temperature deviation becomes smaller, and in accordance with this, the proportional control component Ip begins to increase, and the integral control component Ii(t) begins to decrease, and the supply current Is begins to increase. Then, at time t5 when the target temperature is changed to become higher, the proportional control component Ip abruptly increases to a positive value. In accordance with this, the supply current Is also abruptly increases. At this time, since the integral control component Ii(t)

has the positive value, the supply current Is can also have a sufficiently large value, so that the capacity of the compressor 22 can be sufficiently reduced. As a result, the temperature deviation can be eliminated in a relatively short time. In the prior art, the initial value of the integral control component is zero, and the integral operation is carried out from the beginning, and therefore the integral control component has a large negative value at the above time t5, and the compressor 22 continues to operate at its maximum capacity, so that the response is very slow.

Although FIGS. 5 to 9 show the phenomena involved in the start of the air conditioner and the change of the target temperature, the advantageous effects of the present invention can be achieved also when the outside temperature abruptly changes, when the intake door switches the ventilation from the outside air introduction to the inside air introduction and vice versa, and when windows of the vehicle are opened and closed.

The present invention is not limited to the above embodiment, and various modifications can be made. For example, the capacity of the compressor may be controlled by a PID (proportional-plus-integral-plus-derivative control), that is, by the addition of a derivative control to the above PI control. The supply of the current to the solenoid valve may be controlled by a duty-ratio control. There may be employed an arrangement in which the capacity of the compressor increases with the increase of the supply current to the solenoid valve.

The maximum capacity and the minimum capacity of the compressor are generally determined by the construction of the compressor including the solenoid valve, the cooling system and so on, but may be determined arbitrarily.

What is claimed is:

1. A system for controlling a variable-capacity compressor in an air conditioner including an evaporator, said compressor compressing a cooling medium discharged from said evaporator, said system comprising:
   (a) capacity control means for controlling the capacity of said compressor;
   (b) detection means for detecting the actual temperature of the air downstream of said evaporator;
   (c) target temperature setting means for setting a target temperature of the air downstream of said evaporator;
   (d) temperature deviation calculation means for calculating a temperature deviation between said actual temperature and said target temperature;
   (e) proportional calculation means for calculating a proportional control component in accordance with said temperature deviation;
   (f) integral calculation means for calculating an integral control component in accordance with said temperature deviation;
   (g) control amount calculation means for calculating, in accordance with the sum of said proportional control component and said integral control component, the amount of control to be applied to said capacity control means;
   (h) judgment means for judging whether or not the sum of said proportional control component and said integral control component exceeds a limit value of said control amount corresponding to the maximum capacity of said compressor; and
   (i) integral correction means for subtracting said proportional control component from said limit value of said control amount so as to determine said integral control component when said judgment means judges that said sum exceeds said limit value.

2. A system according to claim 1, further comprising another judgment means for judging whether or not said sum of said proportional control component and said integral control component exceeds another limit value of said control amount corresponding to the minimum capacity of said compressor, and another integral correction means for subtracting said proportional control component from said another limit value so as to determine said integral control component when said another judgment means judges that said sum exceeds said another limit value.

3. A system according to claim 2, in which said capacity control means includes a solenoid valve incorporated in said compressor, said control amount being electric current supplied to said solenoid valve, the capacity of said compressor increasing with the decrease of said supply current, and a lower limit value of said supply current corresponding to the maximum capacity of said compressor being zero whereas an upper limit value of said supply current corresponding to the minimum capacity of said compressor is a positive value.

4. A system according to claim 3, in which an upper limit value of said proportional control component is equal to the upper limit value of said supply current whereas a lower limit value of said proportional control component is a negative value equal in absolute value to the upper limit value of said supply current.

* * * * *